July 9, 1957

R. H. SMITH 2,798,566

TILTABLE WHEEL ASSEMBLY FOR MOTOR VEHICLES

Filed March 23, 1953

INVENTOR

Roland H. Smith

BY Rockwell & Bartholow

ATTORNEYS

July 9, 1957 R. H. SMITH 2,798,566
TILTABLE WHEEL ASSEMBLY FOR MOTOR VEHICLES
Filed March 23, 1953 3 Sheets-Sheet 2
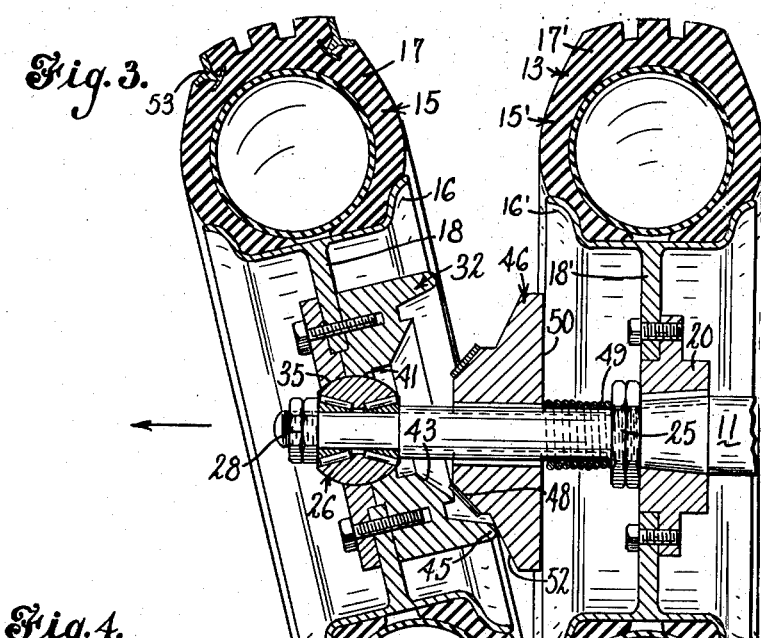
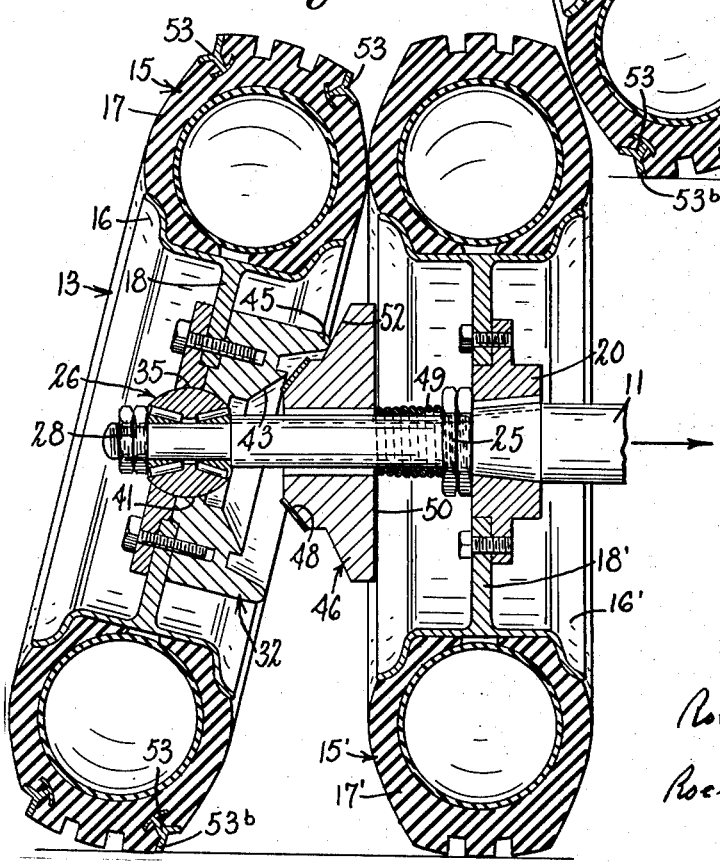
INVENTOR
Roland H. Smith
Rockwell & Bartholow
ATTORNEYS

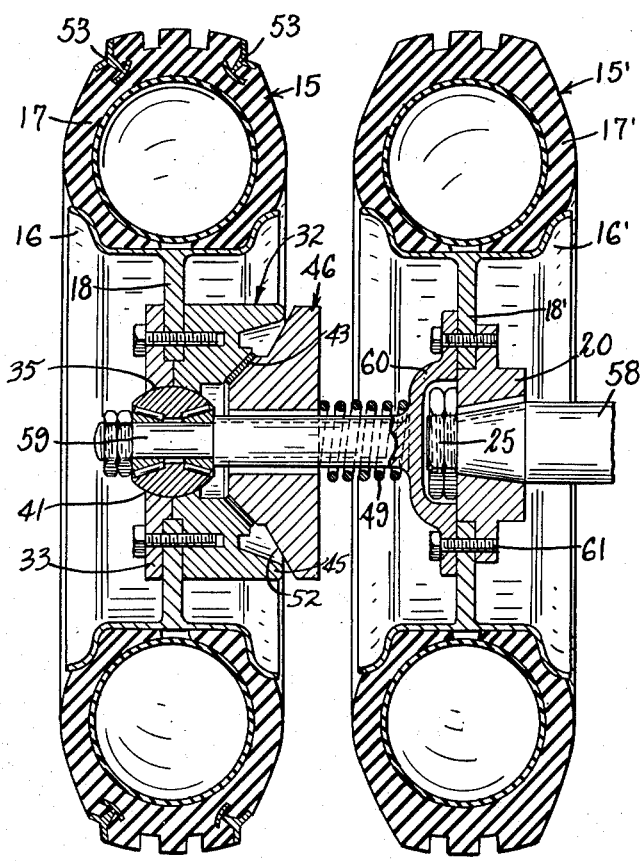
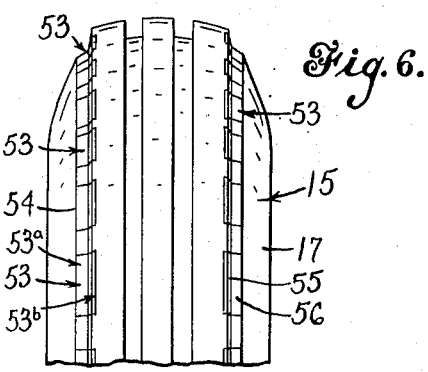

the collar 20 extending into the web 18' of the inner wheel from the inner side thereof and having an outer surface 21 substantially flush with the outer side of the web 18', and the collar 20 being provided with a peripheral flange 22 bolted to the inner side of the web as at 23, and thereby providing a driving connection to the inner wheel 15' from the axle member 11. The axle member 11 is provided with an outwardly facing shoulder 24 at the outer end of the tapered portion 19 thereof, the shoulder 24 being disposed in flush relation with respect to the outer surface 21 of the collar 20, the axle member 11 being provided with a pair of nuts 25 having threaded engagement with a portion thereof outwardly of the shoulder 24 and adjoining the latter. The inner nut 25 may have substantially flatwise engagement with the shoulder 24 and the surface 21 of the collar 20, and the outer nut 25 may serve as a lock nut for the inner nut 25, the nuts 25 preventing movement of the axle member 11 with respect to the collar 20 in a withdrawing direction. As illustrated in Fig. 2 of the drawings, for example, the collar 20 is tapered interiorly to correspond to the tapered portion 19 of the axle member 11, the arrangement being such that the collar 20 and the nuts 25 prevent axial movement of the axle member 11 with respect to the inner wheel 15'.

United States Patent Office 2,798,566
Patented July 9, 1957

2,798,566

TILTABLE WHEEL ASSEMBLY FOR MOTOR VEHICLES

Roland H. Smith, Old Town, Maine

Application March 23, 1953, Serial No. 343,828

7 Claims. (Cl. 180—22)

This invention relates to a tiltable wheel assembly for motor vehicles such as trucks, trailers and the like, and relates more particularly to a wheel assembly for a motor vehcile comprising a wheel which is tiltable on the axis thereof to minimize any tendency of the vehicle to skid laterally. The invention has particular application to a tiltable wheel which may be driven from an axle member. However, the invention is not limited to such an embodiment.

One object of the invention is to provide a wheel assembly wherein two wheels are axially aligned and are mounted side by side, and wherein one of the wheels is tiltable with respect to the other to minimize any tendency of the wheels to skid laterally.

Another object of the invention is to provide a wheel assembly wherein two drivable wheels are mounted side by side in axial alignment and wherein one of the wheels is tiltable with respect to the other.

Another object of the invention is to provide an improved driving mechanism for a tiltable wheel.

Still another object of the invention is to provide an improved mounting for a tiltable wheel.

Other objects of the invention will appear hereinafter as two forms of the invention are described in detail.

In the drawings:

Fig. 3 is a view similar to Fig. 2 illustrating the tiltable wheel in one of the tilted positions thereof;

Fig. 4 is a view similar to Fig. 2 illustrating the tiltable wheel in another tilted position thereof;

Fig. 5 is a view similar to Fig. 2 illustrating a modified form of the invention; and Fig. 6 is a fragmentary view of the tiltable wheel illustrated in Figs. 1 to 5.

Figure 1:
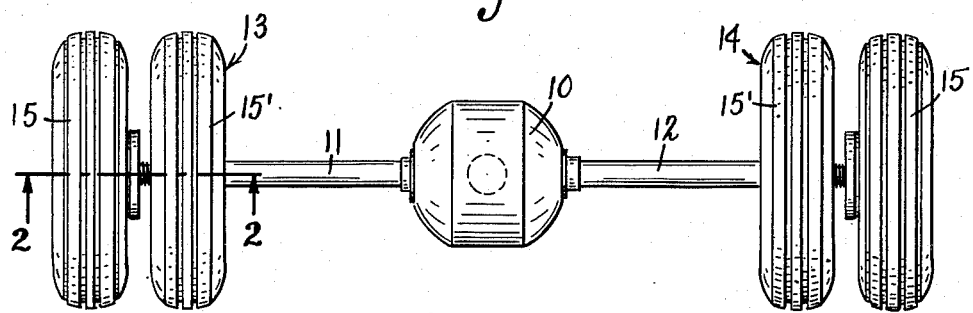
Fig. 1 is an elevational view illustrating two tiltable wheel assemblies associated with a driven axle member.

In the drawings, a conventional differential drive mechanism is indicated generally at 10, the drive mechanism 10 being illustrated as provided with two oppositely extending axle members 11 and 12, the axle members 11 and 12 being equipped with dual wheel assemblies 13 and 14, respectively. The wheel assemblies 13 and 14 are identical and therefore a description of the wheel assembly 13 will suffice. In the wheel assembly 13 the reference numerals 15, 15' designate outer and inner wheels of the assembly, the rims 16, 16' of which carry pneumatic tires 17, 17' which are suitably mounted on the rims 16, 16'. The reference numerals 18, 18' designate integral supporting bodies or webs for the rims 16, 16' which may be of conventional form.

Figure 2:
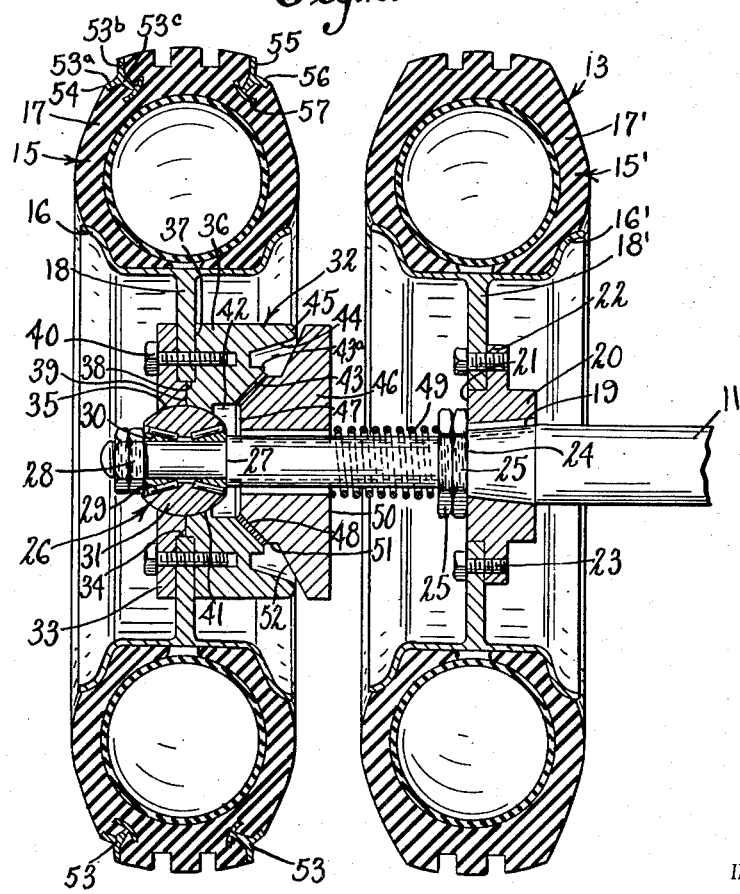
Fig. 2 is an enlarged view of one of the wheel assemblies illustrated in Fig. 1, and illustrating the assembly in axial section, the tiltable wheel being shown in the normal position thereof.

In the form of the invention illustrated in Figs. 1 to 4 of the drawings, the axle member 11 extends through the supporting webs 18, 18' of the wheels. The axle member 11 is provided with an outwardly tapering portion 19 received in and keyed to a collar 20 to drive the latter, The outer end portion of the axle member 11 carries an antifriction bearing structure, indicated generally at 26, abutting an outwardly facing shoulder 27 formed on the axle member 11 and secured thereagainst as by a pair of nuts 28 threaded on the end of the axle member 11. The antifriction bearing structure may comprise two spaced series of rollers 29 having their axes inclined to the axle member 11, two tapered inner race members 30, spaced apart on the axle member 11, one for each series of rollers 29, and an outer race member 31 common to both series of rollers 29, and provided with a partially spherical periphery. As illustrated in Fig. 2 of the drawings, for example, the outer nut 28 serves as a lock nut for the inner nut 28, and the latter engages only the corresponding inner race member of the antifriction bearing structure. The shoulder 27 formed on the axle member 11 engages only the corresponding inner race member 30 of the antifriction bearing structure, the arrangement being such that the antifriction bearing structure is axially fixed on the axle member 11.

In accordance with the invention, the antifriction bearing structure 26 and one element of a friction clutch device, indicated generally at 32, forms a universal joint for the outer wheel 15, the clutch device drivingly connecting the outer tiltable wheel 15 with the axle member 11, as illustrated in Fig. 2 of the drawings, for example. The aforementioned clutch element 32 of the clutch device may be comprised of a plate 33 engaging the outer side of the web 18 and provided with a shoulder 34 engaging the inner edge of the web 18, as illustrated in Fig. 2, for example, the plate 33 being provided with an aperture-defining wall 35 corresponding to the periphery of the outer race member 31 and embracing the latter. The aforementioned element 32 of the clutch may also comprise a block 36 at the inner side of the web 18 having a surface 37 engaged therewith and having a shoulder 38 provided thereon engaging the inner edge of the web 18. The plate 33 and the block 36 are interengaged as at 39, see Fig. 2 for example, and the plate 33 and the block 36 are bolted together and to the web 18 as at 40. The block 36 is provided with an aperture-defining wall 41 corresponding to the periphery of the outer race member 31 and embracing the latter, and from the foregoing it will be clearly understood that the aperture-defining walls 35 and 41 of the plate 33 and the block 36, respectively, form a socket receiving the partially spherical outer race member 31 of the antifriction bearing structure to form a universal joint for the outer wheel 15.

The block 36 of the clutch device may be cut away adjacent the aperture-defining wall 41 as by a counterbore 42 extending longitudinally of the axle member 11 and facing inwardly. Immediately adjacent the counterbore 42 the block 36 is provided with an annular surface 43 tapering toward the counterbore 42, and adjacent the annular surface 43 the block 36 may be cut back annularly as at 43ª and provided with an annular surface 44 tapering in the same direction as the annular surface 43 thereof, the annular surface 44 extending to a rounded surface or rim 45 at the face of the block 36 nearest the wheel 15′. An annular spring-pressed clutch element 46 is provided on the axle member 11 in longitudinally slidable and keyed relation with respect thereto intermediate the wheels 15 and 15′. The clutch element 46, as illustrated, is provided with a forward planar face 47 and an annular surface 48 corresponding with the annular surface 43 of the block 36, and tapering to the face 47. The annular surface 48 of the clutch element 46 may be covered with fibrous material by which the annular surface 43 of the block 36 may be engaged so that the outer wheel 15 may be driven from the clutch element 46 when the tiltable wheel 15 is in the normal position thereof illustrated in Fig. 2 of the drawings, for example. A coil spring 49 is disposed on the axle member 11 between the rear planar face 50 of the clutch element 46 and the lock nut 25, and is constantly under compression, urging the clutch element 46 to the clutch-engaging position thereof. Immediately adjacent the annular surface 48 of the clutch element 46 and rearwardly thereof, the clutch element 46, as illustrated, is provided with a cylindrical surface 51, and immediately adjacent the cylindrical surface 51 and rearwardly thereof the clutch element 46 is provided with an annular surface 52 tapering in the same direction as the annular surface 48. The annular surface 52 of the clutch element 46 is normally disposed in adjacent relation to the rounded surface or rim 45 of the block 36 and in slightly spaced relation thereto, the annular surface 52 being provided for a purpose which will appear hereinafter.

As illustrated in Figs. 2 and 6 of the drawings, the tire 17 of the tiltable outer wheel 15 is provided with two series of substantially Y-shaped inserts 53 preferably formed of steel, each series being located at one side of the tread portion of the tire 17 and being preferably molded therein. The inserts 53 are preferably spaced one inch apart about the circumference of the tire, each presenting twin tongues 53ª and 53ᵇ approximately two inches long and normally flush with the periphery of the tire, as at 54. The stems of the inserts 53 are inclined, as at 53ᶜ, and extend into the tread portion of the tire. The reference numerals 55 and 56 designate side surfaces of each insert 53, which surfaces are preferably flush with adjoining surfaces of the tire 17. Each of the inserts 53 may have an integral arcuately formed base part as at 57, inhibiting separation of the insert from the tire 17. The tire 17′ of the inner wheel 15′ may also be provided with two series of inserts 53 in like manner. However, the inserts 53 are particularly effective on the tire 17 of the tiltable wheel 15 to inhibit lateral skidding of the latter, as will appear hereinafter. From the foregoing it will be understood that, when the outer wheel 15 is tilted to either of the positions illustrated in Figs. 3 and 4 of the drawings, the tongues 53ᵇ of the corresponding series of inserts 53 tend to bite into the road surface to inhibit side slip of the wheels 15 and 15′. It will also be understood that the inserts 53 are strongly resistant to bending owing to their conformation and arrangement in the tire structure of the tiltable wheel.

In accordance with the invention, the normal position of the tiltable wheel 15 is parallel to the fixed wheel 15′. The wheels are spaced a short distance apart and both are drivingly connected to the axle member 11 when the wheels are in parallel relationship, the wheel 15 being clutched to the axle member 11 by the spring-pressed clutch element 46. When the wheel assembly 13 tends to skid in the direction indicated by the arrow in Fig. 3 of the drawings, as from centrifugal force applied to the wheel assembly 13 in the direction of the arrow when the latter negotiates a curve in the opposite direction, the contact of the outer wheel 15 with the road surface causes the wheel 15 to tilt outwardly on the antifriction bearing structure therefor. When and as the outer wheel 15 moves to the last-mentioned position thereof, the rim 45 of the block 36 engages the annular surface 52 of the clutch element 46 at a point below the axle member 11, and the clutch element 46 is thereby cammed inwardly and out of clutching engagement with the clutch element 32, as illustrated in Fig. 3 of the drawings. The spring 49 on the axle member 11 is further compressed by inward movement of the clutch element 46, and the body of the spring 49 serves as a spacer limiting inward movement of the clutch element 46. As illustrated in Fig. 3 of the drawings, tilting movement of the outer wheel 15 is limited by the spring-pressed clutch element 46 and by engagement of the tire of the wheel 15 with the tire of the inner wheel 15′. A brake mechanism (not shown) may be associated with the inner wheel 15′ in a conventional manner, and it will be understood that the brake will not act on the outer wheel 15 when the latter is in the tilted position thereof, illustrated in Fig. 3 of the drawings, but will act on the outer wheel 15 through the spring-pressed clutch element 46 in the normal position of the wheel 15, illustrated in Fig. 2 of the drawings. It will also be understood that, when the outer wheel 15 is in the tilted position illustrated in Fig. 3 of the drawings, inserts 53 of the outer series in the tire 17 will tend to bite into the road surface to inhibit skidding of the wheels 15 and 15′ in the direction of the arrow. When the tendency of the wheel assembly 13 to skid in the direction of the arrow has been overcome, the tiltable wheel 15 is returned to the normal position thereof by the action of the spring 49, the latter thrusting the clutch element 46 engaged with the block 36, as described above, outwardly on the axle member 11 to right the wheel 15. Thus it may be seen that the element 46 may serve not only as a friction clutch element, but may serve as a wheel-righting element.

When the dual wheel assembly 13 tends to skid in the direction indicated by the arrow in Fig. 4 of the drawings, the contact of the outer wheel 15 with the road surface causes the wheel to tilt inwardly on the universal joint therefor. When and as the outer wheel 15 moves to the last-mentioned position thereof, the rim 45 of the block 36 engages the annular surface 52 provided on the clutch element 46 at a point above the axle member 11 and cams the element 46 inwardly and out of clutching engagement with the clutch element 32, as illustrated in Fig. 4 of the drawings. Here again, tilting movement of the outer wheel 15 is limited by the element 46 and by engagement of the tire 17 of the wheel 15 with the tire 17′ of the wheel 15′. When the outer wheel 15 is in the tilted position illustrated in Fig. 4 of the drawings, the tongues 53ᵇ of the inner series of inserts 53 in the tire 17 tend to bite into the road surface to inhibit skidding of the wheels 15 and 15′ in the direction of the arrow. When the tendency of the wheel assembly to skid in the direction of the arrow in Fig. 4 of the drawings has been overcome, the wheel 15 is righted by the above-described action of the spring-pressed element 46.

In the modified form of the invention illustrated in Fig. 5 of the drawings, the illustrated wheel assembly is the same as the wheel assembly 13 described above, except for a difference in the axle structure. In the modified form of the invention the wheel assembly is provided with a rotary axle member 58 similar to the axle member 11 but terminating at the outer side of the lock nut 25. An axle extension 59 is provided which is similar in all respects to the outer end portion of the above-described axle member 11, except that the extension is provided with a cup-like flange 60 disposed over the nuts 25 and bolted to the web 18' and the collar 20, as at 61, the spring 49 being compressed on the extension 59 between the clutch element 46 and the cup-like flange 60. It will be understood that the rotary member 58, with the collar 20 and the extension 59, forms an axle member supporting the inner and outer wheels of the dual wheel assembly. However, the arrangement is such that the tiltable wheel assembly may be easily disconnected and removed from the inner wheel for operation of the latter without the tiltable wheel assembly. The embodiment of the invention illustrated in Fig. 5 of the drawings functions in a manner similar to that of the embodiment illustrated in Figs. 1 through 4 of the drawings.

From the foregoing description of two embodiments of the invention, it will be apparent that, in accordance with the invention, an improved universal joint for a tiltable wheel is provided comprising a partially spherical anti-friction member. Furthermore, a wheel assembly is provided wherein two wheels are axially aligned and are mounted side by side, and wherein one of the wheels is tiltable with respect to the other to minimize any tendency of the wheels to skid laterally. Another feature of the invention is that the outer wheel of the assembly is tiltable with respect to the adjacent fixed wheel and drivable therewith. Still another feature of the invention is the provision of an improved driving mechanism for a tiltable wheel. Moreover, the wheel assemblies illustrated in the drawings are comprised of few and rugged parts and are economical to manufacture.

The wheel assemblies illustrated in the drawings and described herein are susceptible of various modifications within the principles of the invention and the scope of the claims.

What I claim is:

1. In a structure such as described, a driven axle member, a wheel provided with means mounting the wheel on the axle member for universal movement, said wheel being provided with a clutch element in fixed relation thereto, and a clutch element on the axle member in angularly fixed relation thereto, the last-mentioned clutch element being slidably longitudinally of the axle member and spring pressed to engage the other clutch element and drive the wheel from the axle member, and the clutch element fixed to the wheel having means thereon coacting with means on the slidable clutch element to disengage the driving connection between said elements when the wheel is tilted to a predetermied degree.

2. A wheel assembly comprising a driven axle member provided with an abutment, a first wheel fixed on the axle member, a second wheel on the axle member outwardly of the first wheel, an antifriction bearing structure on the axle member for the second wheel comprising a partially spherical outer race member, a friction-clutch element on and in fixed relation to the second wheel and having socket-defining means receiving said race member and forming therewith a universal joint for the second wheel, an annular clutch element on the axle member intermediate the first and second wheels, said annular clutch element being angularly rigid with the axle member and slidably longitudinally thereof, and said annular clutch element being engageable with the first-mentioned clutch element to drive the second wheel from the axle member, and a spring on the axle member compressed between said abutment and said annular clutch element urging the latter to the engaged position thereof, said wheels when parallel to one another being spaced apart a distance such that the first wheel is engaged by the second limiting tilting movement of the latter when the second wheel is tilted to a predetermined degree.

3. A wheel assembly comprising a driven axle member, a first wheel fixed on the axle member, the axle member having a rigid outer extension beyond the first wheel and provided with an abutment, a second wheel on the axle extension, an antifriction bearing structure on said extension for the second wheel comprising a partially spherical outer race member, a friction-clutch element on and in fixed relation to the second wheel having socket-defining means receiving said race member and forming therewith a universal joint for the second wheel, an annular clutch element on the axle extension intermediate the first and second wheels, said annular clutch element being angularly rigid with the axle extension and slidable longitudinally thereof, and said annular clutch element being engageable with the first-mentioned clutch element to drive the second wheel from the axle extension, and a spring on the axle extension compressed between said abutment and said annular clutch element urging the latter to the engaged position thereof, said wheels when parallel to one another being spaced apart a distance such that the first wheel is engaged by the second limiting tilting movement of the latter when the second wheel is tilted to a predetermined degree.

4. A wheel assembly comprising a driven axle member, a wheel fixed on the axle member, the axle member having an integral outer extension beyond the wheel and provided with an abutment, a second wheel on the axle extension, an antifriction bearing structure on said extension for the second wheel comprising a partially spherical outer race member, a friction clutch element on and in fixed relation to the second wheel having socket-defining means receiving said race member and forming therewith a universal joint for the second wheel, an annular clutch element on the axle extension intermediate the first and second wheels, said annular clutch element being angularly rigid with the axle extension and slidable longitudinally thereof, and said annular clutch element being engageable with the first-mentioned clutch element to drive the second wheel from the axle extension, and a spring on the axle extension compressed between said abutment and said annular clutch element urging the latter to the engaged position thereof, said wheels when parallel to one another being spaced apart a distance such that the first wheel is engaged by the second limiting tilting movement of the latter when the second wheel is tilted to a predetermined degree.

5. A wheel assembly comprising an axle member, a first wheel fixed on the axle member, the axle member comprising a detachable extension extending outwardly beyond the first wheel in fixed relationship thereto and provided with an abutment, a second wheel on the axle extension, the axle extension having means cooperating with means on the second wheel to mount the second wheel for universal movement, an annular member axially movable on said extension intermediate said abutment and the second wheel, the second wheel having in fixed and concentric relation thereto an annular part engageable by said annular member, and a spring interposed between said abutment and said annular member to bias the latter toward said annular part so that the second wheel is constantly urged to an upright position.

6. A wheel assembly comprising a driven axle member, a first wheel fixed on the axle member, the axle member comprising a detachable extension angularly rigid with the first wheel and extending outwardly beyond the latter, a second wheel on the axle extension, the axle extension having means cooperating with means on the second wheel to mount the second wheel for universal movement, the axle extension providing an abutment, an annular member axially movable on said extension intermediate said abutment and the second wheel, the second wheel having in fixed and concentric relation thereto an annular part engageable by said annular member, and a spring interposed between said abutment and said annular member to bias the latter toward said annular part so that the second wheel is constantly urged to an upright position.

7. A wheel assembly comprising a driven axle member, a first wheel fixed on the axle member, a second wheel on the axle member outwardly of the first wheel and having means cooperating with means on the second wheel to mount the second wheel for universal movement on said member, a friction-clutch element fixed to the second wheel, and a slidable spring-pressed clutch element angularly rigid with said member and engageable with the first-mentioned clutch element to drive the second wheel, said wheels when parallel to one another being spaced apart a distance such that the first wheel is engaged by the second limiting tilting movement of the latter when the second wheel is tilted to a predetermined degree.

References Cited in the file of this patent

UNITED STATES PATENTS

| Number | Name | Date |
|---|---|---|
| 1,206,895 | Nilson | Dec. 5, 1916 |
| 1,284,759 | Paxton | Nov. 12, 1918 |
| 1,337,510 | Frankman | Apr. 20, 1920 |
| 1,964,105 | Bowen | June 26, 1934 |
| 1,974,009 | Bourdon | Sept. 18, 1934 |
| 2,121,956 | Eger | June 28, 1938 |
| 2,285,445 | Kost | June 9, 1942 |
| 2,354,715 | Tarbox | Aug. 1, 1944 |
| 2,355,133 | Ash | Aug. 8, 1944 |
| 2,397,673 | Lewis | Apr. 2, 1946 |
| 2,512,050 | Ash | June 20, 1950 |
| 2,631,867 | Kost et al. | Mar. 17, 1953 |
| 2,635,012 | Rappaport | Apr. 14, 1953 |

FOREIGN PATENTS

| Number | Country | Date |
|---|---|---|
| 356,572 | France | Oct. 10, 1905 |
| 779,745 | France | Jan. 19, 1935 |